Patented Feb. 13, 1923.

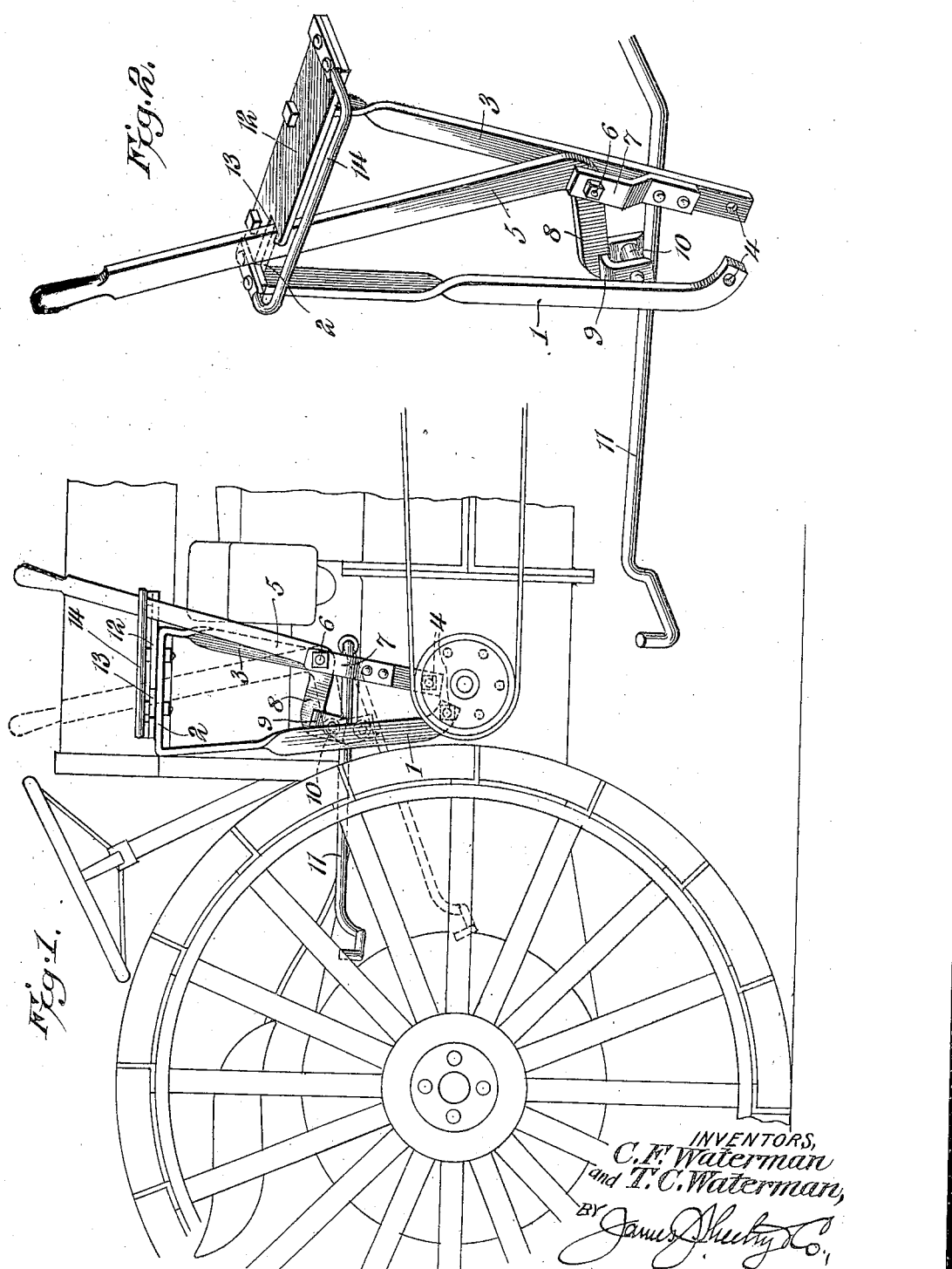

1,445,462

UNITED STATES PATENT OFFICE.

CLARENCE F. WATERMAN AND THEODORE C. WATERMAN, OF INDIANAPOLIS, INDIANA.

CLUTCH MECHANISM.

Application filed December 20, 1921. Serial No. 523,707.

*To all whom it may concern:*

Be it known that we, CLARENCE F. WATERMAN and THEODORE C. WATERMAN, citizens of the United States, residing at Indianapolis, in the county of Marion and State of Indiana, have invented new and useful Improvements in Clutch Mechanism, of which the following is a specification.

Our present invention pertains to hand clutches, release levers and locks, particularly for use in connection with the well known "Fordson" tractor, and it contemplates the provision of a lever through the medium of which the clutch may be readily released and locked and this with but a slight amount of effort on the part of the operator.

The invention further contemplates the provision of a clutch operating mechanism that is simple in construction and operation and so positioned with respect to the tractor that the operator may employ same without the necessity of leaving the seat of the tractor. The lever, moreover is so positioned that the same may be readily reached from the rear or sides of the tractor when the operator has alighted from the said tractor.

The invention further contemplates the provision of a clutch lever that will not only release the said clutch but will retain the clutch in locked position and this will be appreciated as a meritorious feature when it is taken into consideration that any minor adjustments may be made by the operator without the necessity of having a second person hold the clutch in locked position as is the case with the well known lever now in use.

The invention primarily has for its main feature a hand clutch as distinguished from a foot clutch mechanism.

The invention and its further features and advantageous characteristics will be fully understood from the following description and claims, when the same are read in connection with the drawings, accompanying and forming part of this specification, in which:

Figure 1 is a side elevation of a portion of a tractor and showing our novel hand lever, lock and release clutch mechanism as in its operative and inoperative positions.

Figure 2 is a side perspective view of the improved hand clutch mechanism.

Our novel mechanism is preferably secured on the right hand side of the tractor and in easy and convenient reach of the operator positioned on the seat of said tractor, and comprises the main frame portion 1, of steel or other suitable material that terminates at its upper end in the cross bar portion 2, that is formed integral with the portion or main frame 1. This portion 2 is provided with apertures through which pass bolts (not numbered), and through the medium of which the frame portion 1 is secured in a strong and rigid manner to the locking element 12 of our novel device.

This locking element 12 is provided with a guide or guard of suitable material that is bolted at the ends of the locking element, and is indicated by numeral 14 as clearly appears in Figure 2, and the said guide or guard 14 is separated from the right or outer side of the element 12 by a slight intervening space and limits the wabble of the lever handle of the mechanism, and the locking element 12 is further provided in its rear portion with respect to the forward end of the tractor with the kerf or chamber 13. This chamber 13 is so arranged that when the lever has been pulled rearwardly the same is securely confined and prevented from casual forward movement or displacement from the chamber of the locking board or element.

Secured to the under side of the locking element as before set forth is the cross bar portion 2, and formed integral with this bar 2 is the lever brace rod or element 3, that is preferably formed of steel and is square-formed in cross section. This brace 3 is provided near its lower end with the confining clip 7, that is bolted or otherwise secured to the brace 3, and fulcrumed on the brace rod 3 and clip 7 by means of the bolt 6 is our novel hand lever 5.

This hand lever 5 is provided at its upper end with a grip and at its lower end is provided with the L-shaped angle iron portion 8 that extends rearwardly as clearly shown in Figure 2, and at its extreme lower free end, the angle portion 8 is provided with an integral yoke 9, in which we arrange apertures for the reception of a bolt. Arranged on this bolt and surrounding same and adapted to rotate independently thereof is a roller 10 that bears on the clutch rod 11 of the tractor.

The mechanism set forth is secured to a tractor with but a slight amount of effort and without the necessity of drilling apertures in any of the regular equipment of the tractor, and may be applied in a very few minutes by but a single workman. To attach our mechanism to the tractor, it is simply necessary to secure the locking element in proper position, then remove two cap screws from the belt pulley housing of the tractor that are the regular equipment of the tractor, insert said cap screws through the apertures 4 of the brace 1 and brace 3, and replace said screws in their original positions.

Manifestly the application of our device to a tractor is a matter of no moment and materially adds to the convenient operation of the tractor, and when the tractor is being used for belt power, the operator may quickly release the clutch and lock same in release, which action will be attended with practically instant stoppage of the belt power pulley and permit the operator to make various adjustments without the necessity of remaining at his post with his foot on the clutch pedal while a second person makes the adjustments.

Experience has taught that when the motor has been stopped with the belt pulley remaining on the pulley, and our device is not attached to a tractor, it will require at least two men to start the motor again, and on many occasions it is practically impossible to start the motor with the machinery belted up to the tractor unless someone releases the clutch which would free the belt power pulley from the motor. With our locking mechanism all of these objectionable features are eliminated.

We prefer, to form all of the elements of our hand clutch release lever and lock of steel, and because of its simplicity the same is readily adapted for connection with a tractor, and may be as readily removed when occasion demands.

We would distinctly have it understood that we do not wish to be understood as confining ourselves to any particular arrangement or construction of parts, for the reason that in the future practice of the invention, such changes or modifications may be made as fairly fall within the scope of the claims appended.

The invention comprises but a small amount of elements and because of this fact is simple and inexpensive to produce and comprises no delicate parts such as are liable to become inoperative after a short period of use.

Having described our invention, what we claim and desire to secure by Letters-Patent, is:

1. In a device for the purpose set forth, the combination of brace rods, a cross member securing the brace rods to each other, a locking element secured to the cross member, and a lever fulcrumed to one of the brace rods, and having a roller bearing arranged in one end thereof.

2. In a hand clutch release and locking mechanism, the combination of a frame, a locking element arranged above the frame, a locking chamber provided in the element, a guard secured to one side of the element, a lever fulcrumed to the frame, a yoke formed integral on the lever, and a roller confined on the lever in the yoke.

3. In means for the purpose set forth, the combination of brace rods secured at their upper ends to each other, and secured at their lower ends to one side of a tractor, a locking board secured to the upper end of the brace rods, a keeper formed in the locking board, a lever fulcrumed to one rod, and having a roller bearing secured in its lower end, and adapted to be forced in and securely retained by the keeper, and a guard secured to the locking board to prevent casual wabbling of the lever with respect to the board.

4. In means for the purpose set forth, the combination of a frame portion, a locking board secured thereto, a chamber formed in the board, and a lever fulcrumed to the frame portion; said lever being adapted to be confined by a keeper, and having an L-shaped angle portion that extends rearwardly, and having a yoke formed in the angle portion, and a roller bearing arranged in the yoke and confined on the lever, substantially as and for the purpose set forth.

In testimony whereof we have hereunto set our hands in presence of two subscribing witnesses.

CLARENCE F. WATERMAN.
THEODORE C. WATERMAN.

Witnesses:
WILLIAM H. KUEHRMANN,
EMELIA KUEHRMANN.